United States Patent [19]

Morgan et al.

[11] Patent Number: 4,555,955

[45] Date of Patent: Dec. 3, 1985

[54] COMBINATION LOADING TRANSDUCER

[75] Inventors: Paul W. Morgan, Waterford Township, Oakland County; Thomas J. Ellwood, Harrison Township, Clare County; Kish D. Amlani, Troy; John B. Hodges, Brighton, all of Mich.

[73] Assignee: Eaton Corporation, Cleveland, Ohio

[21] Appl. No.: 574,446

[22] Filed: Jan. 27, 1984

[51] Int. Cl.[4] ................................................. G01L 5/16
[52] U.S. Cl. ..................................... 73/862.06; 73/794
[58] Field of Search ........... 73/862.06, 862.04, 862.05, 73/794, 862.49, 862.65; 81/429, 469, 470, 472

[56] References Cited

U.S. PATENT DOCUMENTS

| 2,767,577 | 10/1956 | Gilbert | 73/862.04 X |
| 2,909,764 | 10/1959 | Chambers | 73/862.35 X |
| 3,855,857 | 12/1974 | Claycomb | 73/862.04 |
| 4,485,681 | 12/1984 | Hatamura | 73/862.06 X |

Primary Examiner—Jerry W. Myracle
Attorney, Agent, or Firm—C. H. Grace; A. E. Chrow

[57] ABSTRACT

The performance and condition of a tool, workpiece or machine tool is sensed during machining operations by securing a single or plural strain gages to the tool holder. To increase the sensitivity of the strain gages on stationary tool holders, the tool holders are contoured to provide locations of higher strain in which the strain gages are attached. A single or plural strain gages are positioned to sense the combined effect of different strains such as axial thrust and torque and are electrically connected to provide a single Wheatstone bridge output "signature" which may be monitored to detect a defective operation. In rotating tools, the single "signature" output greatly reduces the coupling equipment such as rotary transformers and also reduces the monitoring equipment. A unique arrangement of a single strain gage or alternatively a plurality of gages enables monitoring of both torque and thrust simultaneously. The output from the plurality of strain gages can be made additive to increase sensitivity and yet requires only a single bridge circuit. The design is flexible in that the gages may be arranged for optimization of the single bridge output for either torque or thrust.

24 Claims, 34 Drawing Figures

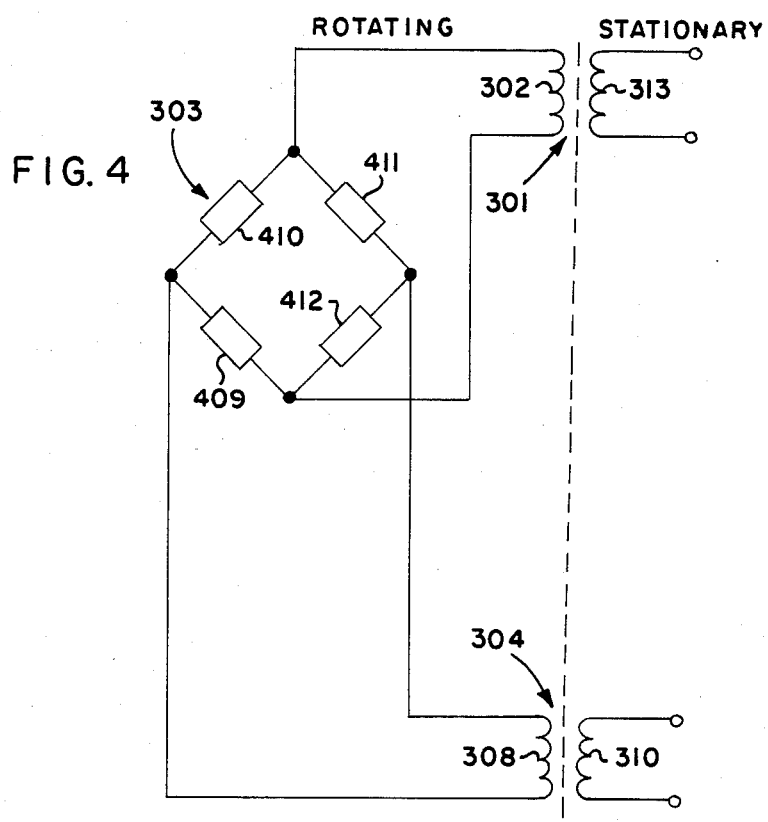
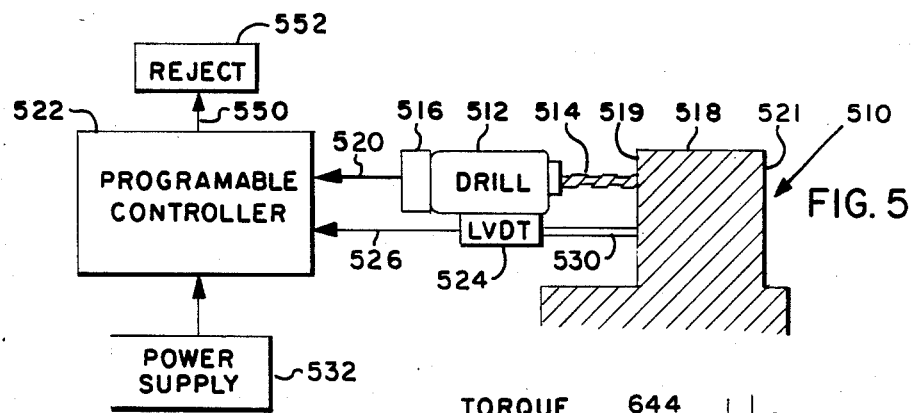
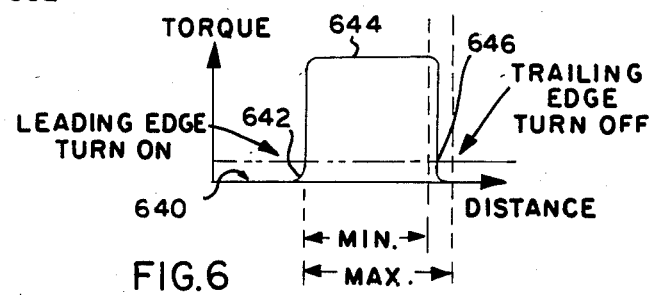

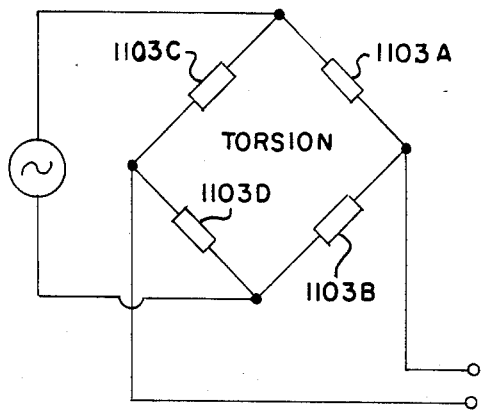
FIG. 15
PRIOR ART
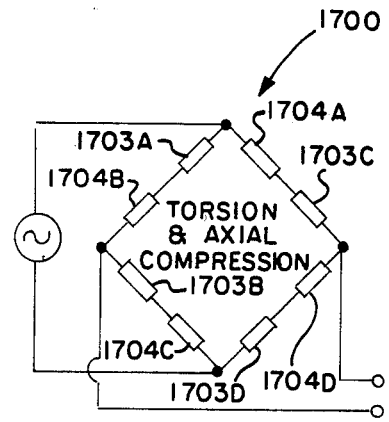
FIG. 19
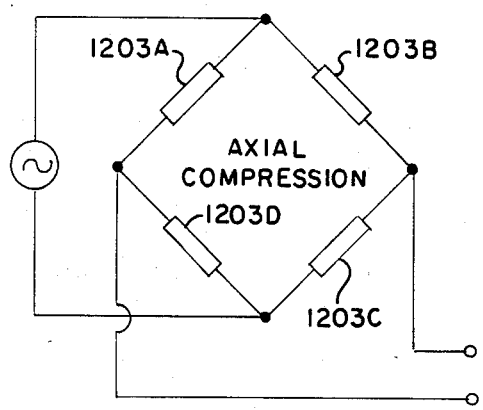
FIG. 16
PRIOR ART
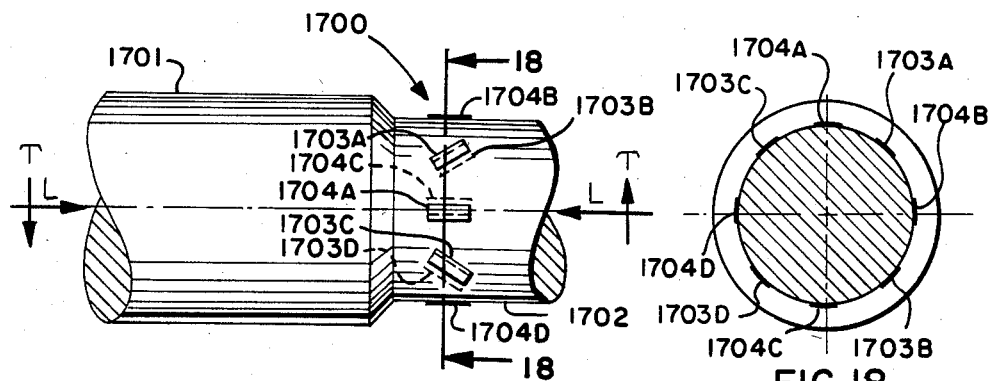
FIG. 17
FIG. 18

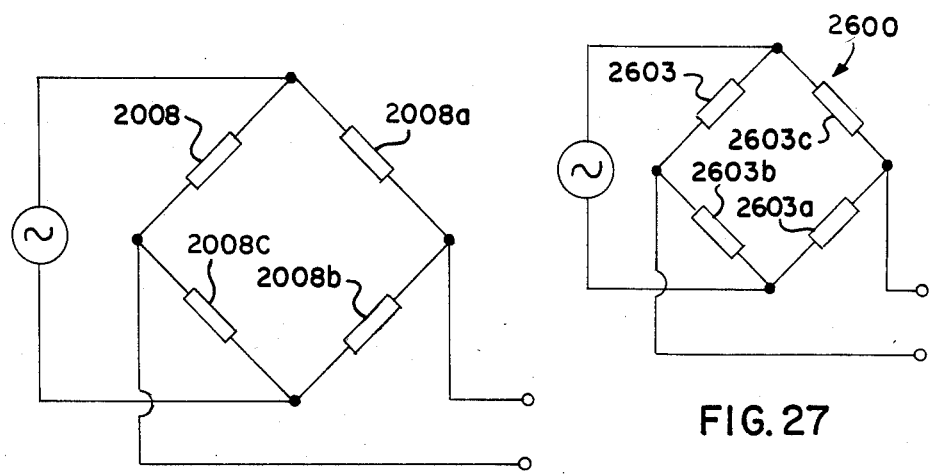
FIG. 25
FIG. 27
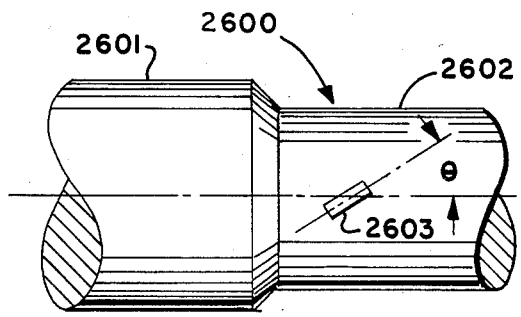
FIG. 26
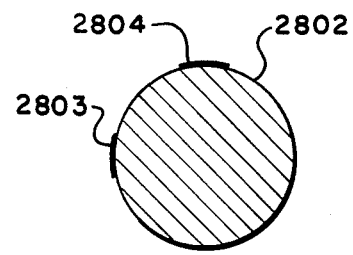
FIG. 29
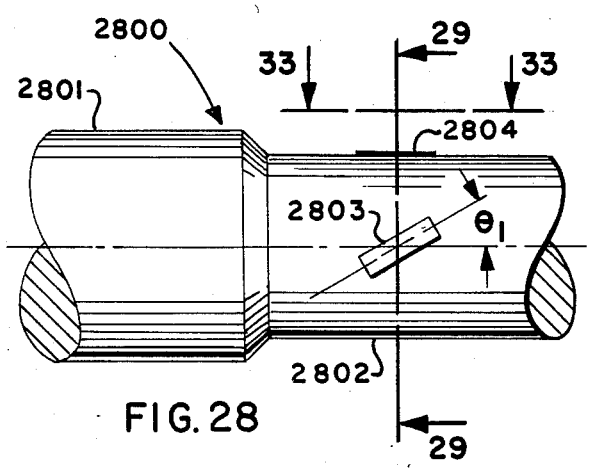
FIG. 28
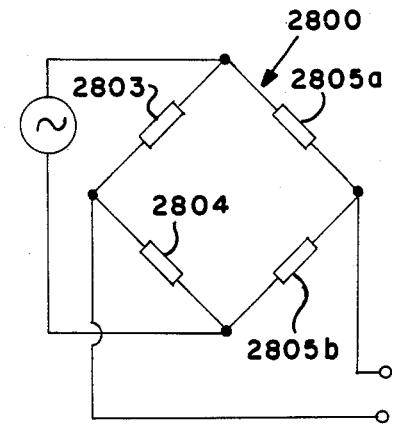
FIG. 30

COMBINATION LOADING TRANSDUCER

BACKGROUND OF THE INVENTION

This invention relates to load sensing devices designed to detect the quality level of the machining process during the machining operation, and more specifically, to sensors or transducers used in such devices for monitoring applied torque and axial loading.

In a recently developed method for detecting the quality of the machining process during machining operations, the torque and axial thrust applied either to the tool, part or holder is sensed during the machining operation, and an electrical signal emitted to determine the "signature" of that operation. The "signature" is compared with signatures of previously machined parts to determine quality level limits for each segment of an operation. The quality of parts machined has a direct correlation to the quality of the machining process.

For example, a first set of sensors mounted to a drill chuck indicate the axial thrust of the drill against the workpiece, while a second set of sensors also mounted to the chuck indicate the torque developed between the drill and the driving source during the various segments of the drilling process.

The drilling process may be conveniently divided into four segments: the first occurring prior to applying the drill to the workpiece, the second occurring as the drill enters the workpiece, the third occurring during the drilling operation, and the fourth occurring as the drill breaks through the workpiece upon completing the drilling operation.

Minimum and maximum limits for torque and axial force for each segment may be determined from prior satisfactory drilling operations. These limits provide comparison guides which indicate whether or not a particular operation is being performed properly at the time it is being carried out. Defective workpieces, defective tools, and malfunctioning machinery including such components as bearings and cams are indicated immediately; and, this indication can be used to actuate an automatic shutdown, an alarm, or other means of alerting the operator to prevent further damage to parts, tools or machinery. This method provides an additional advantage in that the degradation of the tools and machinery as well as the material composition of stock can be monitored to provide an alert that corrective action is required prior to the occurrence of any damage.

To further illustrate the process by which a machining operation "signature" is obtained, reference is made to FIGS. 5 through 8. These Figures disclose a workpiece 510 positioned to have material removed therefrom by a drill 512. The drill 512 rotates a drill bit 514 in a well known manner and the drill bit 514 is disposed so as to penetrate and pass through the workpiece 510 upon relative rotation of the bit 514 and the workpiece 510. The transducer 516 is associated with the drill 512 to sense the torque required to effect rotation of the bit 514 as it passes through the workpiece 510. The torque and force signal monitored by the transducer 516 are directed along the line 520 to a programmable controller 522. A linear variable differential transformer 524 is associated with the drill 512 and provides an output signal on line 526 which is directed to the programmable controller 522 and which is indicative of the position of the drill 512 with respect to the workpiece 510. The linear variable differential transformer 524 includes a probe 530 associated therewith which physically contacts a surface of the workpiece 510 and provides a variable output signal to the programmable controller 522 which is indicative of the relative position of the cutting tool 514 with respect to the workpiece 510. Power supply 532 is provided for energizing the programmable controller 522 in a well known fashion.

In the example ilustrated in FIG. 5, for the drilling of a hole in a wall 518 of the workpiece 510, the torque required to effect rotation of bit 514 will be very low prior to the bit 514 engaging the wall portion 518 of the workpiece 510. As the bit penetrates the wall 519, the torque required to effect rotation of the bit 514 will increase to a higher, relatively constant level until the bit 514 starts to exit from the wall portion 518. At that time the torque required to effect rotation of the bit 514 will drop substantially.

By sensing the torque required to effect the rotation of bit 514 as the bit penetrates and passes through the wall portion 518, various quality characteristics of the workpiece 510 can be determined to determine whether the workpiece 510 is an acceptable workpiece meeting predetermined quality standards. For example, the thickness of the wall 518 can be sensed or the hardness of the material forming the wall 518 can be sensed. "Unusual" signatures not explained by the condition of the tool or workpiece are generally indicative of machine wear or failure. The "unusual" signatures can be catalogued to aid in predicting the need for machine maintenance.

Programmable controller 522 is utilized to generate a torque versus distance "signature" curve as is illustrated in FIG. 6. The torque distance curve plots the torque sensed by the transducer 516 as the ordinate against the particular distance, as the abscissa, that the drill 512 travels as it is sensed by the linear variable differential transformer 524. When the drill 514 passes through the wall portion 518 of the workpiece 510, the drill 514 and the workpiece 510 must move relative to each other through a predetermined cycle. This cycle will include the drill approaching the workpiece 510, the drill penetrating the workpiece 510 and then the drill exiting the workpiece 510 as it passes through the wall portion 518. One such complete movement of the drill 514 relative to the workpiece 510 is defined as a cycle. Each cycle will be broken into a plurality of increments during which torque sensed by the transducer 516 is measured.

FIG. 6 illustrates a typical torque versus distance curve for the drilling operation illustrated in FIG. 5. As the drill bit 514 approaches the wall portion 518 of the workpiece 510, no torque will be exerted on the drill bit 514 by the workpiece 510 and thus the portion 640 of the curve will be generated which is indicative of no torque being exerted between the workpiece and the drill during the initial movement of the drill toward the workpiece. Upon initial engagement of the bit 514 with the wall 518 of the workpiece 510, the torque will rapidly rise as indicated by drawing numeral 642. This function is known as leading edge turn on and can be utilized by the programmable controller 522 to locate the exact distance that a bit 514 has travelled before it has engaged the wall 518 of the workpiece 510. As the bit 514 penetrates the wall 518, the torque exerted will be relatively high but somewhat constant as exhibited at 644 in FIG. 6. When the bit 514 breaks through the surface 521 of the wall 518 of the workpiece 510, the torque exerted on the bit 514 will drop as exhibited at 646 in FIG. 6. This function is known as trailing edge turn off.

FIG. 7 illustrates another example of a drilling operation wherein like parts are identified by like numerals. In this example, it is desired to drill a cross hole 760 into an existing cavity or cross port 762. As the drill bit 514 approaches the side surface 780 of the workpiece 510, initial contact establishes a sharply rising torque curve as shown by drawing numeral 872 in FIG. 8 for "leading edge" electrical switching or turn-on. Upon penetration of the drill bit 514 into the workpiece 510, the torque curve will flatten, as illustrated in FIG. 8 by drawing numeral 874, for the portion of the torque-distance curve which is indicative of high torque; and torque remains relatively constant until the drill bit 514 enters the existing cavity 762. Upon entering the existing cavity 762, the amount of torque required for the drill bit 514 to rotate will be decreased and the torque-distance curve will dip as indicated by drawing numeral 876 in FIG. 8.

If it is desired to further penetrate the wall 782 of the workpiece 510, a torque-distance curve shown in FIG. 8 will appear as indicated by drawing numeral 878 as the bit 514 further penetrates the wall 782.

The portion of the curve in FIG. 8 designated by drawing number 878 will be indicative of high, but relatively constant torque as the drill bit again breaks through the wall portion 782. The torque required to rotate the drill 514 will drop, at the point indicated by drawing numeral 881 in FIG. 8, and "trailing edge" electrical switching or turn off will have been accomplished.

Prior to the development of the signature quality control method, most monitoring of machining operations was designed to minimize damage occurring when a tool failed. An example of such a prior art system is provided in U.S. Pat. No. 3,836,834. This patent described the sensing of bending and feed forces on a machine tool which are compared to limits. If a limit is exceeded, the machine is shut off. There is not attempt in the '834 patent to detect tool or machine degradation, nor to sense additional parameters such as torque or vibration for diagnostic purposes.

Despite the advantages of the signature quality control method described above, there remain a number of practical problems in implementing this method. One set of problems is centered around sensing the torque and lateral thrust encountered in the machining operations. As shown in FIG. 1, one method of sensing both torque and lateral thrust applied to a tool 101 is to mount one strain gage 102 aligned with the longitudinal axis 103 of the holder 104 to sense axial or lateral force and a second strain gage 105 positioned at 45 degrees to the first to sense torqe by sensing shear strains in the plane of maximum shear as is well known to those skilled in the art of stress-strain measurement. Unfortunately, where the tool is rotating, this technique requires two coupling devices, such as rotary transformers or slip rings, for connection to the individual strain gages to extract the information necessary to produce a desired machining "signature". This double coupling requirement is costly and cumbersome, and accordingly has precluded its use in most practical applications.

Where the tool is held stationary, and the work is rotated or otherwise moved with respect to the tool, the rotary coupling devices may be eliminated, but a number of serious practical problems remain. Two signal conditioners, bridge networks and displays or other indicating devices and two sets of quality limits are required to read out the information provided by the sensors and to control the machining process. In addition, these limits and displays must correlated to establish a satisfactory combined quality criteria and means for controlling each phase of a machining operation.

A further set of problems are related to the resistance element in electrical resistance strain gages which are sometimes used as force sensors in machining operations. These strain gage sensors generally do not produce sufficient output when applied to machining tools or machine tool holders to permit reliable detection. One approach intended to overcome this problem is to substitute piezo electric elements have not met with widespread success because of their sensitivity to temperature and inability to reliably withstand the vibration encountered in machining operations.

SUMMARY

It is an object of the present invention to provide a sensor system for sensing a combination of torque and axial load on a rotating or stationary member which requires only one output from the sensor system and only a single coupling device such as a rotary transformer in applications where the sensor system is placed on rotating equipment.

It is an object of the present invention to provide a novel sensor employing strain gages for use in machine tool holders to obtain machine tool "signatures".

It is an object of the present invention to provide a sensor employing a minimum number of resistance strain gages to sense the combined effects of axial loading and torque to obtain machine tool "signatures".

It is an object of the present invention to combine the signals derived from several forces such as torque and axial loading to provide a single composite output signal which may be transmitted by a single coupling device and analyzed by a single analyzer.

It is an object of the present invention to detect the combination of torque and thrust forces to aid in predicting machine and tool degradation.

In the present invention, the elements of a resistance strain gage bridge network are placed at an angle other than zero, 45 or 90 degrees with respect to the longitudinal axis to enable a single gage element or the elements of an entire strain gage bridge circuit to provide an output which is indicative of both torque and axial thrust, thereby eliminating the need for two separate bridges to accomplish this task.

The present invention eliminates the need for dual coupling devices. This is particularly important where coupling devices such as rotary transformers are required for transducer applications on rotating equipment.

Machine tool parts are generally made from hard steels that have a substantial cross section or thickness which exhibits relatively little strain when stressed. Consequently, the output from the resistive strain gages used to measure this strain is relatively low. To overcome this problem, all the elements of the strain gage bridge are placed in the location of high strain to maximize the bridge output. Finally, high sensitivity detection equipment is used to detect the output signal of the bridge.

The elements of a strain gage bridge are oriented on a rotating or stationary tool or workpiece in positions which enable them to act in a complementary fashion in the bridge circuit. One gage is oriented to sense only torque strains and the other gage is oriented to sense only axial load strains. The two gages are connected electrically in series to form a common arm of a Wheatstone bridge network and thus provide an additive or correlative single electrical output indicative of the combined strain effects of applied torque and axial loading. This technique may be applied even though the gages are set for a principal strain axis at an angle other than 90 degrees with respect to the longitudinal axis of the tool. When all four arms of a Wheatstone bridge are employed with torque and thrust sensing gages positioned as described, and series connected for each arm, improved linearity is also achieved.

In a first embodiment of the present invention, the sensor body in the form of a standard tool holder is modified to provide region or a location of increased strain to which the gages, are applied for sensing the combined strain effects of applied torque and axial load. In a second embodiment, a special tool holder is provided with beams or webs to enable the gages of a single bridge circuit to sense the effects of both lateral thrust and torque. The special tool holder has the ends thereof, similar to the ends of a known tool holder; however, the intermediate segment is entirely nonstandard and comprises a plurality of webs or beams separating the two ends from one another along their longitudinal axis. The drive which is supplied to one end of the tool holder is transmitted to the other end through the plurality of beams which are arranged to form a "twisted" hollow cruciform. The angle of the beams with respect to the flanges of the tool holder may be selected to optimize the sensitivity to torque and thrust as required for a particular application.

In the second embodiment, in its simplest form, the combined effect of axial loading and torque is sensed simultaneously by the same single strain sensor, since either type of loading produces a bending deflection of the beams. Sensitivity is increased by placing a plurality of strain gages of like orientation adjacent the ends of the beams in a position to sense bending compression strains in addition to bending tension strains.

BRIEF DESCRIPTION OF THE FIGURES

FIG. 4 is a schematic diagram of a Wheatstone bridge circuit for strain gage transducers showing the excitation and signal coupling transformers.

FIG. 5 is a schematic illustration of apparatus for removing material from a workpiece while monitoring the position of the tool relative to the workpiece.

FIG. 6 is a graph of the applied torque plotted as a function of distance traveled for a drilling operation;

FIG. 10b is an end view in elevation of the holder of FIG. 10a;

FIG. 15 is a schematic of the bridge circuit for FIG. 11;

FIG. 16 is a schematic of the bridge circuit for FIG. 13;

FIG. 17 is a plan view of the present invention embodied in a stationary tool holder.

FIG. 18 is a section view taken along section-indicating lines 18—18 of FIG. 17;

FIG. 19 illustrates a second embodiment with a tool holder having beam coupling for sensing the combined effects of torque and thrust;

FIG. 25 is a schematic of a single strain gage bridge circuit for the transducer of FIG. 22;

FIG. 26 is an elevation view of the invention transducer embodied in its simplest form;

FIG. 27 is a schematic of the bridge circuit for the transducer of FIG. 26;

FIG. 28 is an elevation view similar to FIG. 26 of the invention embodied in an alternative transducer;

FIG. 29 is a cross sectional view of the invention taken along lines 29—29 of FIG. 28;

FIG. 30 is the schematic of the bridge circuit for the transducers of FIGS. 28 and 29;

DETAILED DESCRIPTION

Figure 1:
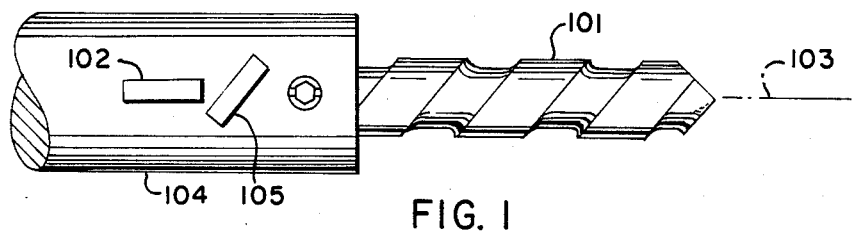
FIG. 1 is a side view of a tool holder and drill, illustrating the placement of strain gages on the tool holder.
Figure 2:
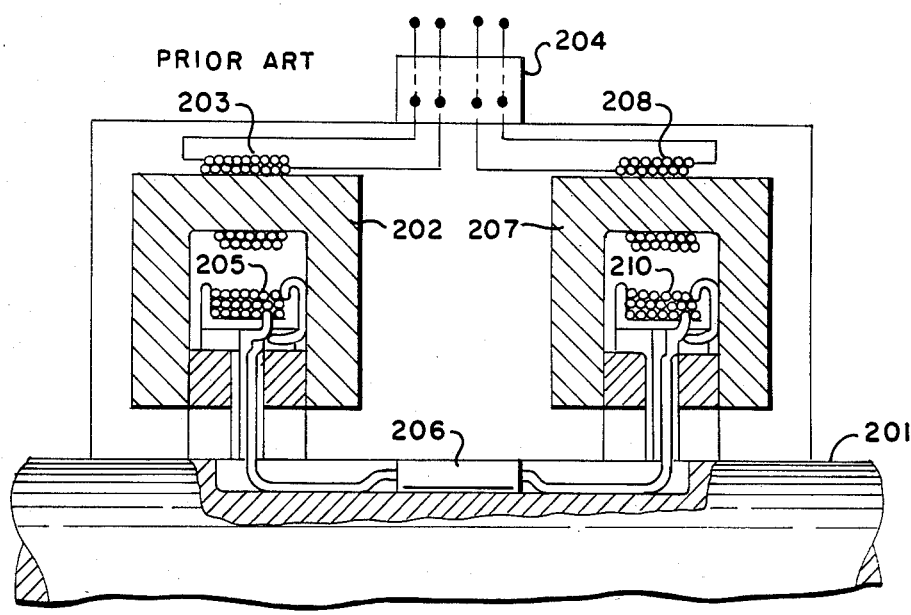
FIG. 2 is a cross sectional view of a rotary transformer used to couple excitation and receive signals from a strain gage transducer.
Figure 3:
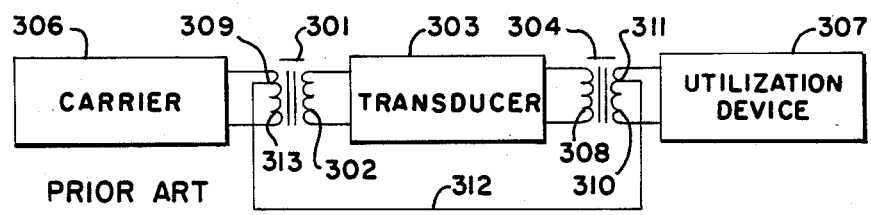
FIG. 3 is a block diagram of the excitation and signal circuits of a transducer.
Figure 7:
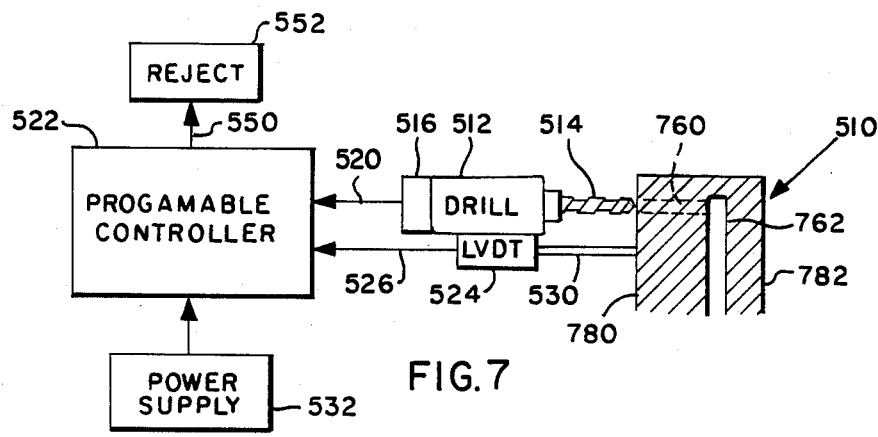
FIG. 7 is a schematic illustration of apparatus similar to FIG. 5, wherein the wall contains a cavity in the drill path.
Figure 8:
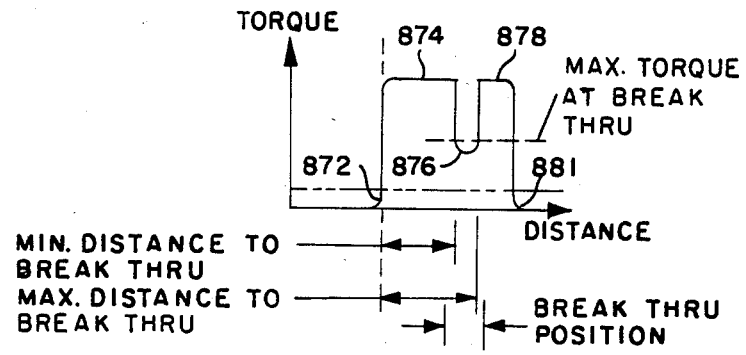
FIG. 8 is a graph of torque plotted as a function of tool distance traveled for the operation carried out in FIG. 7.

A Rotary transformer as used in conjunction with sensors such as strain gages for a rotating transducer is illustrated in FIGS. 2, 3 and 4. Referring first to FIG. 3, a generalized transducer system is shown in which a carrier or source of alternating current 306 is connected to the primary winding 313 of the first transformer 301. For ease of reference, the carrier or source of alternating current is referred to as the system excitation. The secondary winding 310 of the second transformer 304 couples the output voltage to an output or utilization device 307. The output signal is referred to as the system signal. It must be appreciated at this time that a single instrument can provide the functions of a carrier and utilization device and, in fact, such instruments may be calibrated to provide an output reading of the property to be measured by the transducer system.

Referring to FIG. 2, a known transducer system is illustrated for measuring the torque on rotatable shaft 201. The excitation supplied to the input of the system is coupled to the transducer on shaft 201 by a first transformer 202. Transformer 202 includes a stationary or primary winding 203 receiving power from a connecting block 204 and a rotatable or secondary winding 205 connected to a strain gage transducer 206. Also shown is a second transformer 207 having a rotatable or primary winding 210 coupled to the transducer and a stationary or secondary winding 208 transmitting an output signal to the connecting block 204. Both the transformers and the transducers are contained within a housing 209.

Typically, in known arrangements strain gages are arranged in a bridge circuit with excitation being fed across opposite ports of the bridge and system signal being extracted from the remaining opposite ports. A schematic representation of this system is shown in FIG. 4 with the components on the left of the dashed line being mounted on the rotating shaft 201, while the components to the right of the dashed line are mounted on the stationary housing 209. Stationary windings 313 and 310 provide the system input and output, respectively. These windings are secured in the housing 209 on the stationary side, while the rotating winding 302 and 308 on the strain gage transducer 303 are all mounted on and rotate with the shaft 201. The strain gage transducer 303 is a bridge circuit which includes four legs having strain gage elements, 409 through 412.

Transducer systems employing rotary transformer circuits must be calibrated to indicate the parameter measured and special circuitry must be added in order to carry out this function. It can thus be seen from these Figures and the above description that an added rotary transformer is both cumbersome and costly.

Figure 9:
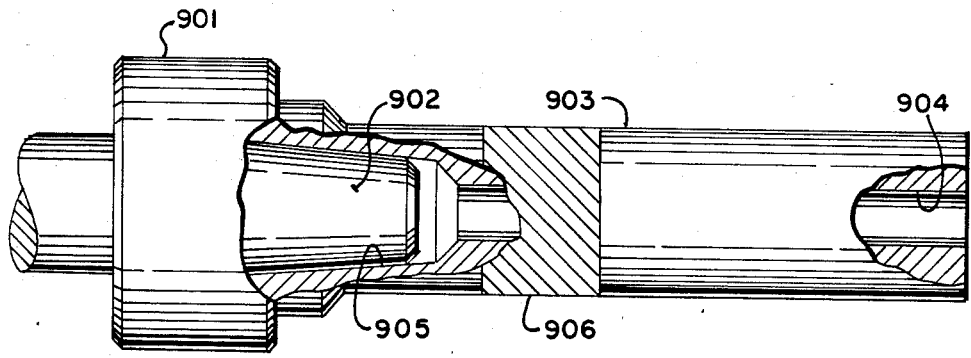
FIG. 9 illustrates a first embodiment with a tool holder prior to fabrication of the transducer in which the preferred location for placing strain gages is indicated.

FIG. 9 shows a rotating driven tool holder 903, having a chuck 901 provided with a tapered collet 905 in one end thereof with a tool 902 received therein. A shaded area 906 located to the right of the Morse taper is reserved for laying the strain gages. A bore 904 is provided in the right-hand end of holder 903.

The present invention provides a transducer emitting a single combined electrical signal indicating the strain effects of both torque and thrust. A plurality of strain gages may be connected in series or parallel or a combination of series and parallel in a common arm of the bridge. To obtain advantages in improved linearity and greater sensitivity, one unit of a set of two identical, electrically connected and mechanically oriented strain gages is positioned at a first location where it will experience a force of one sense, such as tension, while the second unit is positioned where it will experience a complementary force of the opposite sense, such as compression. Units one and two are then connected in adjacent arms of a Wheatstone bridge. Each unit provides an output that is in effect added to the total output of the Wheatstone bridge.

Where the tool holder is stationary, as for example when the workpiece is moved against the tool, the stationary tool holder permits the leads to the strain gages to be brought off directly from the tool holder thereby eliminating any rotary coupling. However, there is still an advantage in combining the signals from strain gages measuring different forces because the combined signal provides a single output for an operator or a computer to monitor. This greatly simplifies the operation for either the operator or the computer. Furthermore, only one signal conditioner and power supply are required.

In addition, it is possible to accentuate different parameters differently during different phases of an operation. For example, if the distance a drill moves before contacting a workpiece is desired, the most important parameter is lateral thrust because this will be sensed before any appreciable torque has been developed from the drilling operation. This can be appreciated from considering the fact that only the narrow tip of the drill initially makes contact with the workpiece.

Figure 10A:
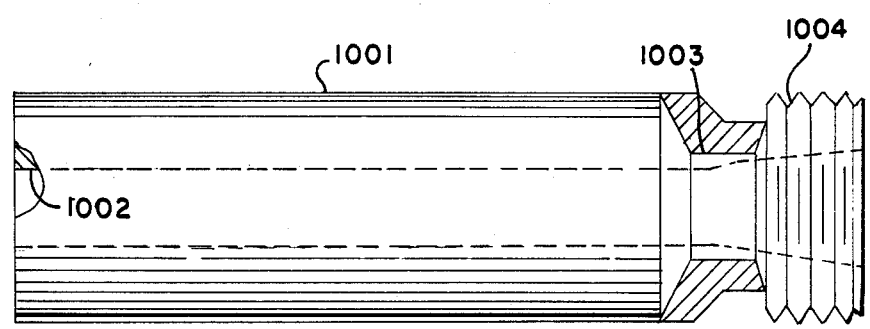
FIG. 10a shows a tool holder similar to the holder of FIG. 9, and machined to provide a location of higher stress for the mounting of strain gages.
Figure 10B:
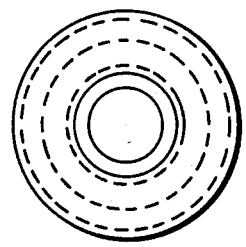

Referring to FIG. 10a, there is shown in side elevation view a tool holder 1001 and FIG. 10b shows and end elevation of the tool holder of FIG. 10a. The tool holder 1001 contains an opening 1002 and threads 1004 at the right-hand end for the purposes of mounting the tool. The annular areas 1003 is machined away around the holder to provide a higher stress area for mounting strain gages in order to increase the elastic strain deformation and thus the sensitivity for use of electrical resistance strain gages. However, the stress in area 1002 is only raised by an amount to increase strain for gaging and not by an amount sufficient so to materially weaken the tool.

Figure 11:
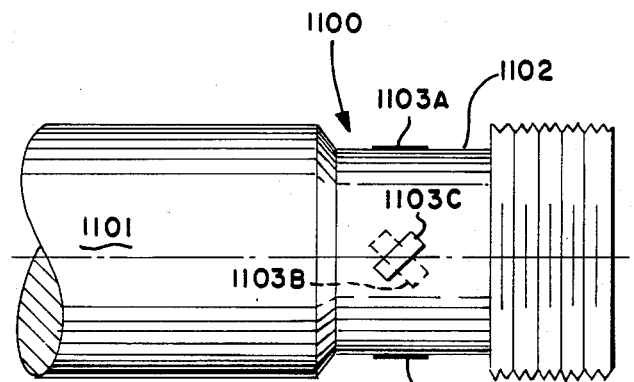
FIG. 11 illustrates in plan view a tool holder machined as in FIG. 10, having strain gages mounted to sense only strain effects of a torque applied about the axis of the holder.
Figure 12:
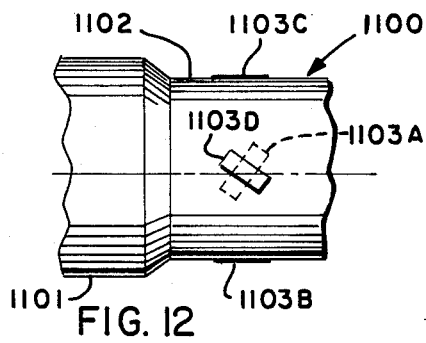
FIG. 12 is an elevation view taken along section-indicating lines 12—12 of FIG. 11.

FIGS. 11 and 12 show a prior art torque transducer, indicated generally at 1100, comprising a tool holder 1101 having a configuration similar to that of FIG. 10 with strain gages mounted in a machined out area 1102. The known transducer 1100 is instrumented with four strain gages spaced at 90° central angles about the periphery of the area 1102. Each of the gages 1103 A, B, C and D is oriented at approximately 45° to the axis of the holder 1101. Gages 1103C and 1103B sense tensile strains for an applied clockwise torque while gages 1103A and 1103D sense compressive strains. The gages are thus arranged to sense only torsional strains. Referring now to FIG. 15, the bridge network for the transducer 1100 is shown with tension serving gages 1103C and 1103B disposed on opposite legs of a Wheatstone bridge circuit. Compression strain sensing gages 1103D and 1103A are disposed oppositely in the remaining legs. The bridge output thus averages the compression and tensile strains due to shear stresses as is well known.

The four gage bridge circuit of FIG. 15 provides improved linearity and sensitivity over a single gage installation wherein dummy resistors are used to complete the Wheatstone bridge.

Figure 13:
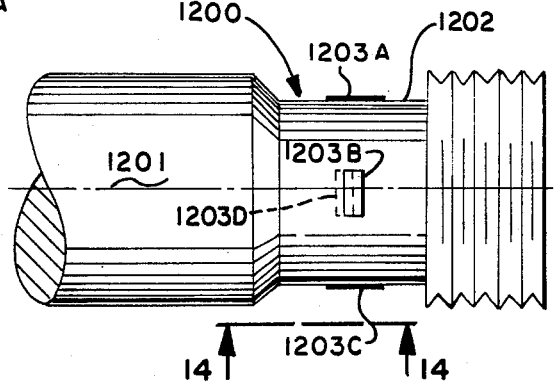
FIG. 13 is a plan view of a tool holder machined as in FIG. 10, with the strain gages arranged to sense only strain from axial loading.
Figure 14:
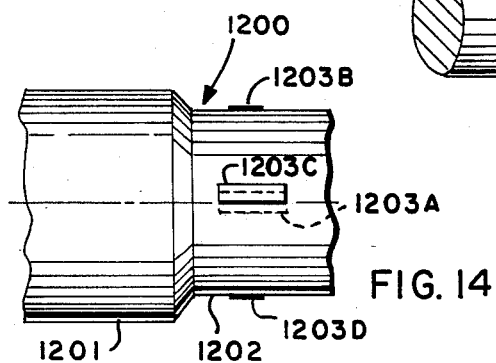
FIG. 14 is an elevation view taken along section indicating lines 14—14 of FIG. 13.

FIGS. 13 and 14 show a prior art axial load transducer indicated generally at 1200 having a tool holder 1201 with a machined away region 1202 having strain gages mounted thereon. The device of FIG. 13 is similar to that of FIG. 11 with the exception of the orientation of the strain gages. In the FIG. 13 configuration, the strain gages are arranged to be either perpendicular to or parallel with the longitudinal axis of the tool holder. This arrangement permits measurement of thrust rather than torque.

Referring particularly to FIGS. 13 and 14, the transducer 1200 has four strain gages 1203A, B, C and D disposed about the periphery thereof and spaced at 90° angles circumferentially thereabout.

Gages 1203A and 1203C are oriented parallel to the axis of the holder 1201 for sensing axial compression.

Strain gages 1203B and 1203D are oriented at right angles to the axis of the tool holder and sense in tension, the lateral Poisson-effect strains due to axial compression loading of the tool holder.

Referring now to FIG. 16, the bridge circuit for the transducer 1200 of FIG. 13 is shown wherein compression sensing stain gages 1203A and 1203C are disposed in opposite legs of a Wheatstone bridge and tension strain gages 1203B and 1203D are disposed oppositely in the remaining legs of the bridge.

The prior art transducers 1110 and 1200 each sense only one type of loading e.g. torsional or axial and thus require separate bridge excitation and signal conditioning circuits in order to determine the overall loading for a tool holder if both types of gaging are employed on a common tool holder.

Referring to FIG. 17, one embodiment of the present invention is shown as applied to a stationary tool holder similar to the tool holders 1101 and 1201 of FIGS. 11 and 13. In the FIG. 17 embodiment, a combined loading transducer indicated generally at 1700 is shown as comprising a tool holder 1701 having a machined surface 1702 of reduced diameter for increased strain and for receiving strain gages.

Referring to FIGS. 17 and 18, the strain gages of transducer 1700 are shown disposed circumferentially about the periphery of the region 1702 of the tool holders 1701, in generally equally spaced arrangement. Four torsion serving gages 1703A, B, C & D are employed and are disposed in 90° arcuate spacing and oriented about principal axes rotated 45° from the vertical as shown for sensing strains due to an applied counterclockwise torque in FIG. 18. Additionally, four strain gages 1704A, B, C and D are disposed for sensing strain due to axial compression loading. The two sets of gages 1703, 1704 are preferably disposed at the same axial station on the tool holder area 1702; however, it will be understood that the sets may be located at two axially spaced stations if it is desired to orient the torsion sensing gages 1704 on the vertical and horizontal principal axes of the tool holder section, as are the compression sensing gages 1703.

Referring to FIG. 19, the Wheatstone bridge circuit for the non-rotating transducer embodiment 1700 of the present invention is shown for providing a single Wheatstone bridge circuit which, when balanced, provides an electrical signal indicative of the effects of combined axial and torsion loading. Comparison of such a bridge output with a desired signal trace as a function other parameters, such as tool travel can thus provide monitoring of a drilling or machining operation to provide indication of any of several failure modes, yet requires only a single bridge circuit.

In the unique bridge arrangement of FIG. 19, the compressive strain gages 1704A and 1704C are disposed in opposite arms of the bridge and are shown connected in series with the appropriate one of the compression sensing gages 1703B, 1703C of the torsion sensing set 1703. The Poisson-effect tension strain gages 1704B, 1704D are disposed oppositely in the remaining bridge arms and are also each connected in series with the appropriate one of the torsion tension gages 1703A, 1703D. The bridge network of FIG. 19 for the transducer 1700, thus has each arm of the bridge comprising a torsion sensing and axial load sensing strain gage electrically in series giving the bridge arm maximum sensitivity to the combined effects of the overall loading. Although the plurality of gages in each arm of the bridge of FIG. 19 is shown connected electrically in series, it will be understood that the plurality of gages in each arm may also be parallel connected to achieve the same combined load sensing effect.

The bridge arrangement for the transducer 1700, thus enables a single transducer having a single bridge circuit to replace two separate bridge circuits for separate indications of torsional and axial loading. The plural gages in each bridge are connected in series, however, it will be understood that the gages in each arm may also be connected in parallel. Although the invention has been illustrated in the transducer 1700 as adapted for stationary loading, it will be understood that the tool holder 1701 may also be gaged for rotation by employing rotary electrical coupling such as the transformer arrangement as described hereinabove with reference to FIG. 4.

Referring to FIG. 26, an alternative embodiment of the invention is shown as embodied in the transducer indicated generally at 2600 in which a solid tool holder 2601 is provided with a reduced diameter strain-increasing portion 2602. A strain increasing portion could also be achieved by increasing the inside bore diameter of the tool holder, or by cross-drilling. The transducer 2600 embodies the invention in its simplest form in which a single strain gage is utilized to sense the combined strain effects of torsion and axial loading. It will be understood that the tool holder 2601 may otherwise be identical to the tool holder of FIGS. 11 and 13 in all respects except the strain gage mounting.

The single strain gage 2603 is disposed at an acute angle o with respect to the longitudinal axis of the tool holder 2601 in order that the gage 2603 senses the combined strain effects of torsional and axial applied loads on the tool holder. In the presently preferred practice of the invention, the angle o is in the range 15°–30° and preferably $22\frac{1}{2}$°.

The Wheatstone bridge circuit for the single gage 2603 is shown in FIG. 27 and employs dummy resistances 2603a, 2603b and 2603c respectively, one in each of the remaining arms of the bridge.

The novel $22\frac{1}{2}$° orientation of the single gage 2603 permits the single gage to sense the combined strain effects of torsion and axial load in the reduced diameter region 2602, thereby providing sufficient sensitivity to render the transducer 2600 practical. If it is desired, increased sensitivity may be obtained, at additional cost, by adding additional strain gages for replacement of the dummy resistors. It will be understood that if additional strain gages are employed, they are oriented by an angle o differing somewhat the angle o employed for the single gage 2603 as will be described hereinafter.

Referring now to FIGS. 28–30 and 34, another embodiment of the invention is shown in the form of transducer 2800, having a tool holder 2801 with strainable structure comprising a strain increasing reduced diameter section with gaging surface 2802. The tool holder 2801 is similar to the tool holder 2601 of FIG. 26.

In transducer 2800, surface 2802 has mounted thereon a pair of strain gages 2803 and 2804 disposed spaced in quadrature on the surface 2802 subtending a central angle of 90° in a plane transverse to the loading axis as shown in FIG. 29. Gage 2803 has its strain sensing direction oriented at an acute angle $\theta_1$ in the range 15°–30°, and preferably $22\frac{1}{2}$° with the loading axis as shown in FIG. 28 for sensing compressive strains. It will be understood that gages 2803, 2804 may alternatively be spaced diametrically opposite in the plane of FIG. 29.

Referring to FIG. 34, gage 2804 is oriented at an angle $\theta_2$ in the range 35°–39° and preferably 37° with the axis of the holder 2801 for sensing tensile strains.

The bridge circuit for the transducer 2800 is shown in FIG. 30 in which gages 2803 and 2804 are disposed individually in adjacent arms of the bridge for improved linearity and increased sensitivity. Dummy resistors 2805a and 2805b are provided in the remaining legs of the bridge. It will be understood that dummy resistors 2805a and 2805b may be replaced with additional active gages disposed in quadrature with gages 2803, 2804 on gaging surface 2802 for a further increase in sensitivity.

It will further be understood that the transducers 2600 and 2800 may be employed either as stationary transducers, or as rotating transducers employing a rotary transformer coupling for excitation and bridge output coupling as is shown in FIGS. 2, 3 and 4.

Figure 20:
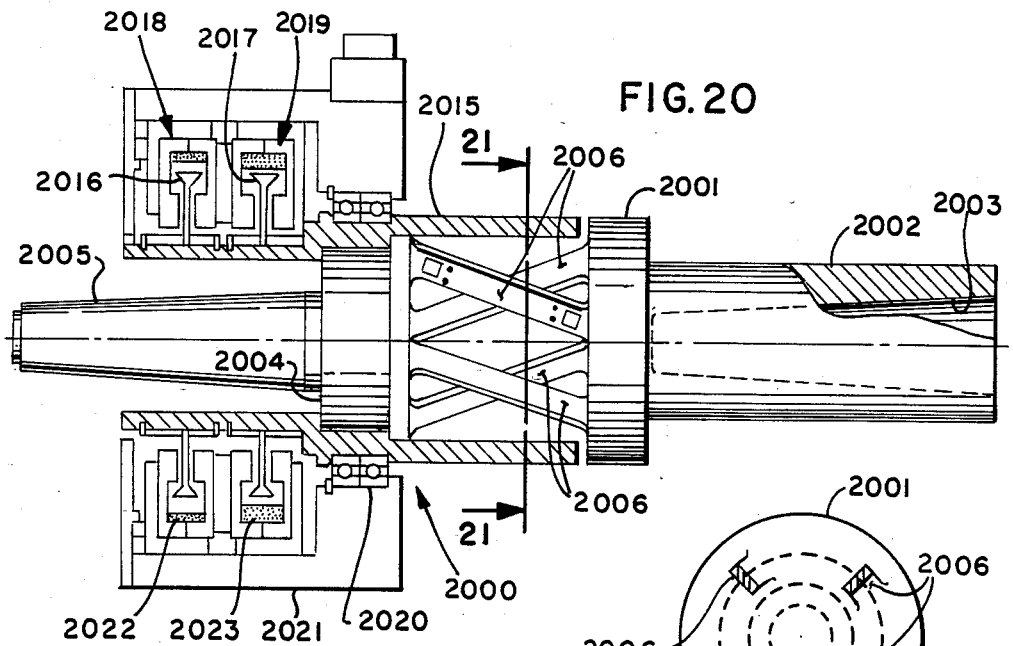
FIG. 20 is an elevation view of a second transducer embodiment of the invention employed for combined load sensing in a rotating tool.
Figure 21:
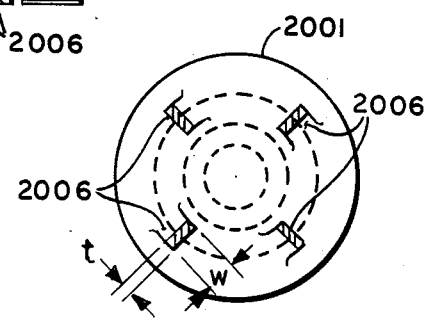
FIG. 21 is a section view taken along section-indicating lines 21—21 of FIG. 20.

Referring to FIGS. 20 and 21, the invention is illustrated in another form as embodied in a unique transducer indicated generally at 2000, having increased sensitivity to both torsion and axial loading and adapted for use with a rotating tool. The transducer 2000 comprises a tool holder 2001 having the right hand end portion 2002 provided with an internal Morse taper 2003 adapted for receiving a rotating tool therein in frictional driving engagement. The opposite end portion 2004 of tool holder 2001 has provided thereon an external Morse taper 2005 and is adapted for frictional rotary driving engagement with a driven shaft (not shown) having a corresponding internal taper. The region of the tool holder 2001 intermediate tapers 2003, 2005 is hollowed out and comprises a plurality of circumferentially spaced generally axially extending webs or beams 2006 which serve to interconnect the end portions 2002, 2004.

The beams 2006, preferably four in number, are each disposed at an acute angle with the longitudinal axis of rotation of the tool holder and are preferably disposed in circumferentially equally spaced arrangement.

Each of the beams 2006 has its ends rigidly attached to respectively one of the opposite portions 2002, 2004 of the tool holder 2001 such that any applied axial or torsional loading of the portions 2002, 2004 results in bending deflection of beams 2006.

Referring to FIG. 21, in the transducer 2000 of the present practice, the beams 2006 each have a transverse section which has a thickness, denoted "t" in FIG. 21, which is substantially less than the radial width, denoted "w" in FIG. 21. Preferably the ratio of w/t is in the range 2–5.

Figure 22:
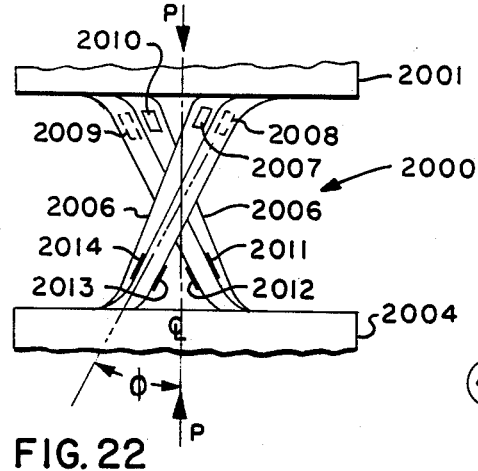
FIG. 22 is an enlarged view of a portion of FIG. 20.

Referring to FIG. 22, the angle denoted "$\phi$" subtended by each beam 2006 with the axis of the tool holder is preferably in the range 15°–45°. The preferred arrangement of the strain gage in transducer 2000 is shown in detail in FIG. 22 for two of the beams 2006.

The angle "$\phi$" may be optimized to enhance the strain effect of either torsional or axial loading. Keeping "$\phi$" near the lower limit enhances torsional strain; whereas keeping "$\phi$" near the upper limit enhances axial loading effects.

The transducer 2000 is illustrated in FIG. 22 as preferably having two strain gages on each beam, forming a full bridge circuit; however, it will be understood that a partial bridge circuit may be employed utilizing only two strain gages. The strain gages are disposed in pairs adjacent the ends of the beams 2006 in the region of maximum bending movement, with the gages disposed on opposite faces of the beam 2006. Referring to FIG. 22, strain gages 2007 and 2008 comprise such a pair. Where the axial loading is compressive, as denoted by the arrows "P" in FIG. 22, gage 2007 senses compressive bending strains and gage 2008 senses tensile bending strains.

Application of either a counter-clockwise or clockwise torque to the ends 2001, 2004 of the transducer increases the bending deflection armature of the beams 2006, depending upon the direction or sense of the applied torque.

However, in it simplest form, the invention requires only a single strain gage on one of the beams 2006. Although the output signal of the bridge is reduced where only one strain gage is employed, the bending deflection of the beams 2006 is sufficient to produce a useable transducer with only a single strain gage since any bending of the beams 2006 is a result of the combined efforts of torsion and axial loading. In a single gage arrangement, any one of the torsion gages 2008, 2009, 2011 or 2014 may be employed. As shown in FIG. 25, the single gage 2008 is employed in one arm of a Wheatstone bridge, and the remaining arms each contain a dummy resistor 2008a, 2008b and 2008c respectively.

Although the loaded deflection curvature of beams 2006 will be somewhat different for an applied counter clockwise torque as compared to an oppositely applied torque load, it will be understood the beams 2006 respond in bending to either sense of applied torque or to axial loading and thus the strain gages 2007, 2008 read either tensile or compressive strains resulting from the combined effects of the transducer loading.

In order to average the affects of any assymmetry of the applied loading, it is desireable to add gages 2009, 2010 which are likewise mounted on opposite faces of another one of the beams 2006 and adjacent the upper end thereof. Although gages 2009, 2010 are disposed adjacent the upper end of the second one of the beams 2006, it will be understood that they may alternatively be disposed adjacent the lower end of the second beam 2006.

Figure 23:
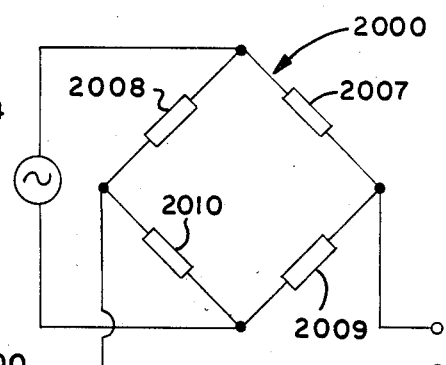
FIG. 23 is a schematic of a bridge circuit for the transducer of FIG. 22.

Gages 2007, 2008, 2009 and 2010 thus may be connected each in a separate arm of a Wheatstone bridge circuit, as shown in FIG. 23 with the tension sensing gages 2008, 2009 disposed in opposite arms of the bridge. The single bridge circuit of FIG. 23, thus gives a single output responsive to the combined effects of any applied torque and any axial loading of the transducer 2000. By sensing bending strains of the beams or webs at their root, the transducer 2000 provides a high degree of electrical strain sensitivity to torque and axial loading in a single bridge output signal. As described above, by varying the angle "$\phi$", the effects of either torque or axial loading may be enhanced in the combined bridge signal. The overall sensitivity of the transducer to any given applied load is determined by the values chosen for the beam dimension "t" and "w" and the number and length of the beams.

If only minimum sensitivity and accuracy is required, gages 2009, 2010 may be eliminated and gages 2007, 2008 may be connected in adjacent arms of a bridge (not shown) and dummy resistances employed for the remaining arms.

With continued reference to FIG. 22, an additional four strain gages 2011, 2012, 2013 and 2014 may optionally be employed for even greater sensitivity and accuracy. For convenience of illustration, optional gages 2011–2014 are shown in FIG. 22 as mounted in pairs with one pair on the lower end of the same beams 2006 as gages 2007–2010. However, it will be understood that the optional gages 2011–2014 may alternatively be mounted in pairs on either end of the remaining two (not shown in FIG. 22) of the four beams 2006.

Figure 24:
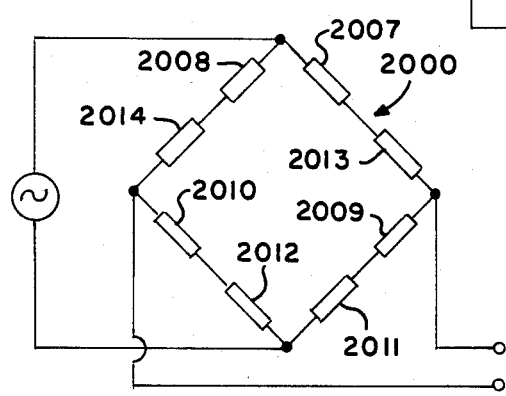
FIG. 24 is a schematic of an alternative bridge circuit for the transducer of FIG. 22.

Referring now to FIG. 24, the Wheatstone bridge circuit for the eight gages 2007–2013 is shown. Torsion strain gages 2008, 2014 are connected in series in one arm of the bridge and tension strain gages 2009, 2011 are connected in series on the opposite arm of the bridge. Compressive strain gages 2007 and 2009 are connected in series on a third arm of the bridge, with compressive strain gages 2012 and 2010 series connected in the remaining bridge arm opposite therefrom. The eight gage strain sensing bridge network of FIG. 24 provides averaging of the strains in all four beams 2006. The additional averaging of the bridge of FIG. 24 is obtained at additional cost as compared to the bridge of FIG. 23.

Referring to FIG. 20, the rotating transducer 2000 has an inner bearing race 2015 received over the outer periphery of end 2004 of the tool holder and supports rotating coils 2016, 2017 of input and output transformers indicated generally at 2019, 2018. Output transformer 2018 has a stationary secondary coil 2022 and input transformer 2019 has a stationary primary coil 2019 mounted on housing 2021. The rotary transformer arrangement of FIG. 20 thus may be similar to that described in FIGS. 2 and 3 in construction and function is generally well known in the art.

The unique feature of the transducer 2000 of FIG. 20 is not in the excitation and pickup technique, but rather that a single bridge circuit yields an output which includes the combined strain effects of axial and torsional loading.

The unique web or beam sensing elements 2006 of transducer 2000 provide a high degree of strain sensitivity by sensing bending of the beams in response to axial or torsional loading of the transducer. The present invention thus provides a novel and unique way or means of sensing the combined strain effects of torsional and axial loading and requires in its simplest form only a single strain gage in a single bridge circuit to yield a single electrical signal indicative of the combined strain effects. However, additional strain gages may be added for increased sensitivity. The single bridge circuit strain gage transducer of the present invention may be employed in either stationary or rotating applications experiencing combined torsional and axial loading.

Figure 31:
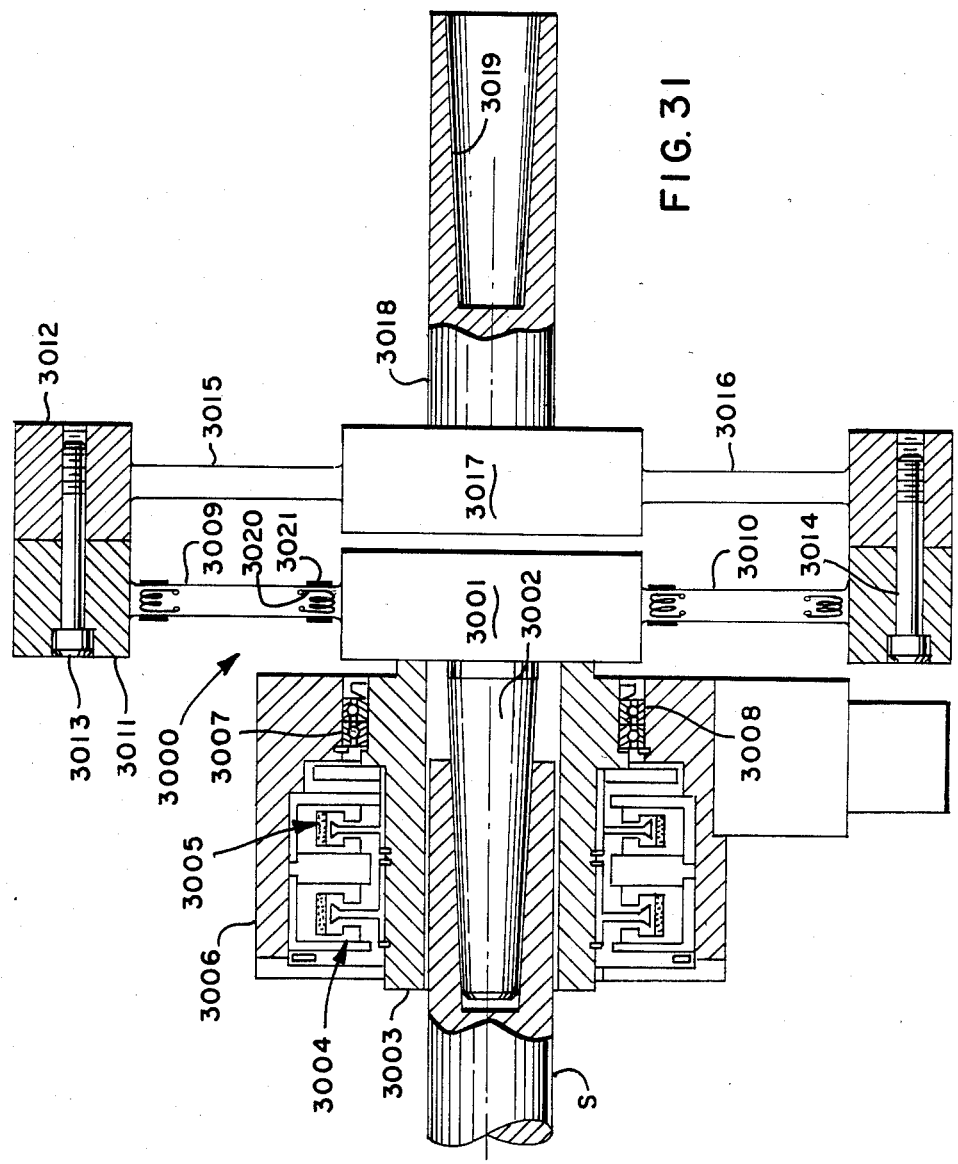
FIG. 31 is an elevation view of another rotating transducer embodiment of the invention for sensing combined loading.

Referring now to FIG. 31, another embodiment of the invention is shown for rotating tool application in the form of a unique transducer, indicated generally at 3000 operatively connected to a rotating shaft S. Transducer 3000 includes an input end means comprising hub 3001 having an axially extending stub shaft at 3002 extending leftward therefrom in FIG. 31. Stub shaft 3002 has an external Morse taper thereon which is received in frictional driving engagement with a corresponding internal Morse taper provided in shaft S.

Hub 3001 has an annular hub extension 3003 extending leftwardly therefrom and disposed concentrically over stub shaft 3002. Extension 3003 has mounted thereon for rotation therewith the secondary coil of an excitation rotary transformer, indicated generally at 3004, and spaced axially therefrom is provided the primary coil of an output rotary transformer indicated generally at 3005. The primary coil of rotary transformer 3004 and the secondary coil of rotary transformer 3005 are each respectively mounted on a stationary housing 3006 in a manner similar to the rotating coupling shown in FIG. 4. The hub 3001 is journaled for rotation in the housing 3006 by means of suitable bearings 3007, 3008 disposed on the extension 3003.

Hub 3001 has a plurality of radially outwardly extending spokes provided thereon, two of which 3009, 3010 are shown in FIG. 31 as having their outer end connected to an outer annular flange 3011. The spokes 3009, 3010 comprise elastically deflectable beams elongated in the radial direction and preferably having a rectangular transverse section similar to the beams 3006 in FIG. 21. A second outer annular flange 3012 is provided and is disposed axially adjacent flange 3011 and secured thereto by suitable fastening means as for example, bolts 3013, 3014. Second annular flange 3012 has attached thereto in a circumferentially spaced arrangement about the inner periphery thereof a plurality of radially inwardly extending spokes or beams 3015, 3016 having the radially inner ends attached to a second hub 3017. The second hub 3017 has attached thereto in rigid driving engagement a stub shaft 3018 which extends axially in a rightward direction as shown in FIG. 31. Stub shaft 3018 has provided in the end thereof an internal Morse taper 3019 for receiving therein, in frictional engagement, a suitable rotating tool (not shown).

Hub 3017 is thus suspended from flange 3012 by the beams 3015, 3016 and is axially spaced from hub 3001 by a desired amount to permit limited axial movement of one hub with respect to the other before mutual contact occurs.

At least one of the spokes 3009, 3010, 3015 and 3016 has provided thereon a plurality of strain gages 3020, 3021 which are disposed near the inner end of the spoke closely adjacent hub 3001. The strain gages 3020, 3021 are disposed so as to sense logitudinal bending strains in the beam or spoke 3009. The gages 3020, 3021 are mounted with one gage such as 3020 lying in a plane parallel to the axis of rotation and the second gage 3021 lying in a plane perpendicular to the axis of rotation. This arrangement enables gage 3020 to sense torsional bending deflection of the spoke 3009 and gage 3021 to sense axial deflection of spoke 3009.

In practicing the present invention, the gages 3020, 3021 are connected electrically together in a common arm of a Wheatstone bridge circuit similar to that shown in FIG. 19. It will be understood that gages 3020, 3021 may be either connected electrically in series or parallel in a common bridge arm.

If desired, additional sets of strain gages may be employed, as for example at the outer end of the spokes and if desired either or both sets of spokes extending from the hubs may be strain gaged. The transducer 3000 is thus an alternative way of practicing the teachings of the invention described with respect to FIG. 22, in that combined effect of torsional and axial loading are sensed by strain gaging a common bending beam to detect compressive and tensile bending stresses in the beam due to the applied loading.

Figures 32, 33:
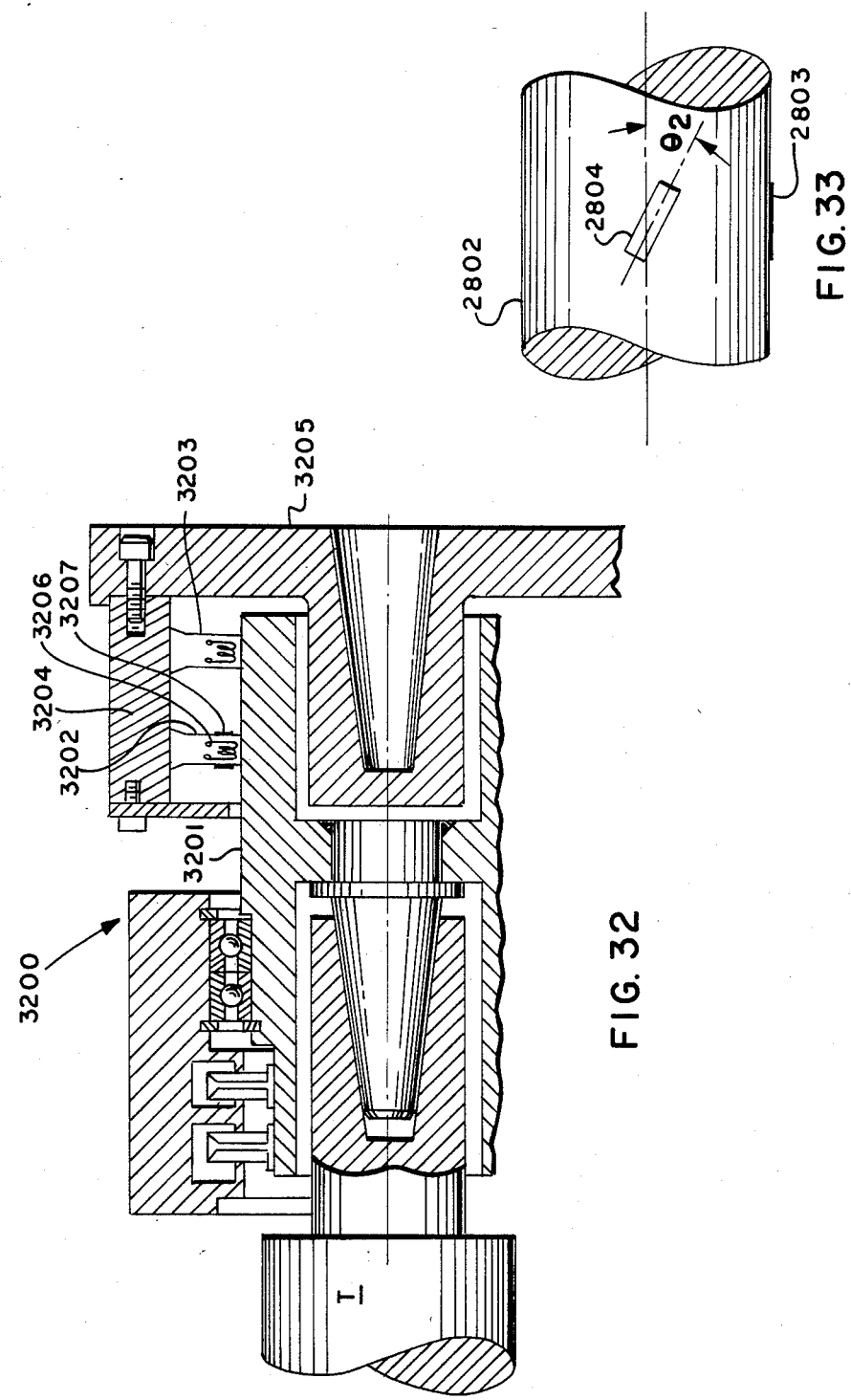
FIG. 32 is a further alternative embodiment of the transducer of FIG. 31.
FIG. 33 is a view taken along section-indicating lines 33—33 of FIG. 28.

Referring now to FIG. 32, another embodiment of the invention is shown for a rotary transducer 3200, wherein an input shaft T engages a driving hub 3201 which as a plurality of rows of axially and circumferentially spaced spokes 3202, 3203 extending radially outwardly therefrom and connected to a common outer flange 3204. Flange 3204 is actually axially connected to a second flange hub 3205 for receiving a rotating tool (not shown). The spoke 3202, 3203 are strain gaged in a manner identical to that described with respect to the transducer 3000 in FIG. 31.

The present invention thus provides a unique load transducer having in its simplest form a single strain gage sensing the combined strain effects of applied axial and torsional loading and producing a single bridge output signal for the combined loading.

Although the invention has hereinabove been described with respect to the illustrated embodiment, it will be understood that modifications and variations may be made and the invention is limited only by the following claims.

We claim:

1. A torque and thrust sensor for machine tools of the type in which the machine provides a source of drive power to a tool, the tool being applied to the workpiece in order to perform work thereon, comprising:
   (a) a tool holder connected between the source of drive power and the tool to supply the drive power to the tool, the tool holder comprising:
      (i) a central axis running generally from the source of drive power to the tool,
      (ii) a first flange having its principal surface oriented generally orthogonal to the central axis of the tool holder,
      (iii) a second flange having its principal surface oriented generally orthogonal to the central axis of the tool holder and its principal surface positioned apart from and facing the principal surface of the first flange,
      (iv) a plurality of beams connected at one of their ends to the principal surface of the first flange and at their other ends to the principal surface of the second flange, the connection to the flanges being adjacent the periphery of the flanges and the beams each being connected at an angle phi with respect to the central axis for bending in response to torque or axial loading of the tool holder.
   (b) a strain gage device mounted on a beam and oriented to measure a desired strain in the beam produced by the operation of the tool on the workpiece.

2. A torque and thrust sensor as claimed in claim 1, wherein the beams join the principal surfaces of the flanges at a common radial distance.

3. A torque and thrust sensor as claimed in claim 1, wherein the strain gage device is comprised of a plurality of individual strain gages each mounted adjacent the junction of the beam and the principal surface of a flange.

4. A torque and thrust sensor as claimed in claim 1, wherein the strain gage device comprises a first set of two strain gages with one gage being mounted on one end of a first beam while the other is mounted on the opposite end of the same beam, but both are on the same surface of the beam and each is oriented parallel to the principal surfaces of the flanges, one strain gage sensing compression, while the other senses tension for either a torsional or a thrust load on the tool holder.

5. A torque and thrust sensor as claimed in claim 4, further comprising a second set of two strain gages with the first gage of the second set being mounted on the opposite side of the beam from the first strain gage of said first set and the second strain gage of the second set being mounted on the opposite side of the beam from the second gage of said first set, one of the gages in the second set measuring tension while the other measures compression and all four gages being connected in a Wheatstone bridge configuration in aiding fashion to produce a maximum output for either a torsional or thrust load on the tool holder.

6. A torque and thrust sensor as claimed in claim 1, wherein the angle of the beams with respect to the central axis is adjusted to optimize the output for the ratio of torque to thrust from the strain gages.

7. A torque and thrust sensor as claimed in claim 6 in which the strain gages on opposite ends of the beam are connected to a first set of opposite arms of a Wheatstone bridge circuit.

8. A torque and thrust sensor as claimed in claim 7 further comprising a second set of two additional strain gages connected to a second beam in a manner similar to that of the first set, the second set of strain gages being series connected into the remaining opposite arms of the Wheatstone bridge to complete the bridge circuit, and whereby said output comprises a single signal representing both torque and thrust.

9. A transducer for sensing the effects of axial and torsional loading and providing an electrical output indicative thereof comprising:
   (a) body means including first end means defining a first surface adapted for receiving input torsional and thrust loading about an axis, said body means further including second end means defining a reaction surface adapted for transmitting said input loading to a reaction member and elastically strainable structure disposed intermediate said first surface and said reaction surface, said strainable structure including gaging structure defining a sensing surface, said gaging structure defining the region of maximum stress in said strainable structure;
   (b) a single strain gage disposed on said sensing surface, said strain gage having the sensing direction thereof oriented at an acute angle in the range 15°–30° with respect to the axis of loading for sensing effects of combined torsion and thrust loading and,
   (c) bridge circuit means operative, upon connection to a source of electrical power, to apply an electrical potential to said strain gage and operative to detect changes in the resistance of said gage in response to said combined torsion and thrust loading of said transducer and operative to provide an output signal indicative of said loading.

10. The transducer defined in claim 9, wherein
   (a) said gaging structure comprises a plurality of spaced elongated beams each extending between said first and second end means; and,
   (b) said gaging surface comprises a portion of the surface of one of said beams adjacent an end thereof, said beams being deflected in bending upon application of said axial and torsion loading of said transducer except that said single gage has its sensing direction oriented longitudinally in the direction of elongation of said beam for sensing tension or compression, strains due to said bending.

11. The transducer defined in claim 10 further comprising a second strain gage disposed on said beam at substantially the same longitudinal station therealong and on the surface of said beam opposite said first single gage for sensing strains in the sense opposite said first single gage, said second gage electrically connected is said bridge circuit such that said bridge circuit detects the combined changes in resistance of said gages.

12. The trandsucer defined in claim 10, further comprising a plurality of strain gages, with a first pair of same mounted on one of said beams adjacent and on opposite sides the end thereof and a second pair of same disposed adjacent one end and on opposite sides of a second beam, with said pairs connected in said bridge circuit means such that said bridge circuit means detects the combined resistance change of the individual gages in each pair and provides a single electrical output indicative of all the resistance changes.

13. The transducer defined in claim 10, wherein said beams are circumferentially spaced generally axially extending and each subtend an acute angle with said loading axis.

14. The transducer defined in claim 10, wherein said beams are circumferentially spaced and each subtend an acute angle in the range 15°–45° with the said loading axis.

15. The transducer defined in claim 10 wherein said first end means includes a hub and said beams extend radially outwardly therefrom with said second end means including structure connected to the radially outward end of each of said beams.

16. The transducer defined in claim 9, wherein said strainable structure comprises an elongated generally cylindrical member and said gaging structure comprises a reduced transverse section or necked portion.

17. The transducer defined in claim 16, wherein a plurality of gages are substituted for said single gage, having one of said gages disposed with is sensing direction oriented substantially parallel to said loading axis, a second gage disposed with its sensing direction oriented generally at transversely to said loading axis and spaced on said gaging surface by a quadrant from said first gage, a third gage disposed to have its sensing direction at an acute angle of substantially 45° with said loading axis and a fourth gage also having its sensing direction at 45° spaced diametrically opposite of said third gage, said first and second gages electrically connected such that said bridge circuit means senses the combined change in resistance thereof and said third and fourth gages electrically connected such that said bridge circuit means senses the combined change in resistance therof.

18. The transducer defined in claim 9, further comprising a second strain gage also oriented at 15°–30° to said loading axis and disposed in spaced quadrature from said first single gage, said second gage operatively connected to said bridge circuit means electrically in parallel with said output.

19. A torque and thrust sensor for machine tools of the type in which the machine provides a source of drive power for a tool, the tool being applied to a workpiece to perform work thereon, comprising:
(a) a tool holder connected between the source of drive power and the tool to supply the drive power to the tool, the tool holder including an extended portion which spans the distance between its connection to the tool and its connection to the source of drive power, said extended portion having a central axis running generally through the central area of the tool holder from its connection to the source of drive power to its connection to the tool and containing a reduced cross-sectional area that is not greater than its cross-sectional area at its connection to the source of drive power and at its cross-sectional area at its connection to the tool; and
(b) a plurality of strain gage devices mounted to the tool holder in the extended area, said strain gage devices individually oriented and electrically connected to produce a combined signal representing torque and thrust strains in the tool holder produced by the operation of the tool on the workpiece.

20. A torque and thrust sensor as claimed in claim 19 in which the individual strain gages are series connected for producing a combined output signal.

21. A torque and thrust sensor as claimed in claim 19, in which the individual strain gages are parallel connected for producing a combined output.

22. A torque and thrust sensor for a machine tool of the type in which the machine provides a source of drive power to a workpiece, the tool being held fixed, while the workpiece is applied to the tool in order to perform work on the workpiece, comprising:
(a) a tool holder connected between the machine and the tool to hold the tool in a fixed position, the tool holder including an extended portion which spans the distance between its connection to the tool and its connection to the machine, said extended portion having a central axis running generally through the central area of the tool holder in the direction from its connection to the machine to its connection to the tool and containing a reduced cross-sectional area that is not greater than its cross-sectional area at its connection to the tool and is not greater than the cross-sectional area at its connection to the source of drive power; and.
(b) a plurality of strain gage devices mounted to the tool holder in the extended area, said strain gage devices individually oriented and electrically connected to produce a combined signal representing torque and thrust strains in the tool holder produced by the operation of the tool on the workpiece.

23. A torque and thrust sensor as claimed in claim 22, wherein a first number of the individual strain gages are oriented parallel to the central axis of the holder and a second number of the individual strain gages are oriented orthogonal to the central axis of the tool holder.

24. A torque sensor as claimed in claim 23, in which a third number of individual strain gages are oriented parallel to the central axis of the tool holder, a fourth number are oriented perpendicular to the central axis of the strain gage and a fifth number are oriented at nominally 45 degrees to the central axis of the tool holder.

* * * * *